United States Patent [11] 3,612,345

[72] Inventor Lester L. Fike, Jr.
 Blue Springs, Mo.
[21] Appl. No. 843,653
[22] Filed July 22, 1969
[45] Patented Oct. 12, 1971
[73] Assignee Fike Metal Products Corporation
 Blue Springs, Mo.

[54] RUPTURE DISC PRESSURE RELIEF STRUCTURE FOR POLYMERIZATION REACTORS
 5 Claims, 3 Drawing Figs.

[52] U.S. Cl. ..................................... 220/89 A
[51] Int. Cl. ..................................... F17b 1/14
[50] Field of Search ........................ 137/68, 74; 220/89, 27, 47

[56] References Cited
 UNITED STATES PATENTS

| 2,523,068 | 9/1950 | Simpson et al. | 220/89 A |
| 2,656,950 | 10/1953 | Coffman | 220/89 A |
| 2,716,506 | 8/1955 | Fike | 220/89 A |
| 2,766,904 | 10/1956 | Philip | 220/89 A |
| 3,463,351 | 8/1969 | Mills | 220/89 A |
| 3,474,344 | 10/1969 | Perl | 220/3 |

FOREIGN PATENTS

| 129,460 | 7/1919 | Great Britain | 220/89 A |

Primary Examiner—Raphael H. Schwartz
Attorney—Schmidt, Johnson, Hovey & Williams ABSTRACT: A rupture disc assembly for use in a system susceptible to both positive and negative pressures and wherein polymerization of resinous materials necessitates cleaning of the assembly. The need for a heretofore required separate vacuum support is eliminated by constructing the rupture member in a manner such that it will withstand substantial negative pressures while still being rupturable at a preselected positive pressure. The nonfragmenting rupture member is provided with a pair of intersecting grooves extending across the low-pressure side thereof, and the member is constructed of a thickness at least three times as great as would be required to rupture it in the absence of the grooves. A layer of chromium on the high-pressure side of the rupture member presents a surface to which resinous materials have little tendency to adhere and which may be readily and effectively cleaned. The disc clamping unit of the assembly has opposed inner annular edges which tightly engage the disc without the usual groove therearound to preclude accumulation of polymer around the exposed perimeter of the disc.

PATENTED OCT 12 1971 3,612,345

INVENTOR
Lester L. Fike Jr.

BY Schmidt, Johnson, Hovey,
Williams & Chase.
ATTORNEYS.

RUPTURE DISC PRESSURE RELIEF STRUCTURE FOR POLYMERIZATION REACTORS

This invention relates to safety pressure devices and, more particularly to rupture disc pressure relief structure especially useful for polymerization reactors.

In many instances where a bulged frangible diaphragm is provided in a pressurized system to serve as a relief opening at a predetermined pressure differential, it is also desirable to provide sufficient support for the inside of the diaphragm to prevent the latter from reversing itself should the inside pressure drop significantly below the pressure on the outside of the diaphragm.

Prior devices for closing the relief opening in a system susceptible to both positive and negative pressures are largely of the type illustrated in U.S. Pat. No. 2,716,506 wherein a separate "vacuum support" is provided in underlying relationship to the frangible diaphragm.

Devices of the type illustrated in the aforementioned patent have not been satisfactory for use with polymerization reactors where buildup of resinous materials on the inner side of the rupture assembly frequently occurs. The buildup of resinous materials around the structural components which must normally be provided for the vacuum support member disrupts the functioning of the assembly at a predetermined pressure, and cleaning of the assembly is made extremely difficult by the uneven surface normally presented thereby. High-pressure steam ejected from a handheld nozzle has usually been employed to clean polymer adhering to the disc assembly. However, this cleanup procedure as not always effective and often times workmen had to enter the reaction vessel and make an effort to dislodge the polymerized composition through the use of chisels and hammers. Manifestly, this was dangerous work and detrimental to the vessel as well as the rupture disc unit frequently resulting in replacement thereof being necessary. Even in those cases where a vacuum support for the assembly was not required, the porosity of the inner surface of the frangible member caused the unit to be susceptible to the buildup of resinous materials. Since the thickness of a rupture disc varies somewhat across its area, particularly at the periphery thereof, and the bulged portion is not necessarily at the center of the overall disc, it has been conventional practice to use flange assemblies for receiving and holding the disc which include a lower flange ring provided with an inner annular notch of increasing diameter as the outer periphery thereof is approached and another flange ring provided with an inclined rib adapted to complementally fit the notch. The edge portion of the disc is thereby clamped between surfaces at an angle to the axis of the opening through the flange assembly. An annular groove is presented though, upon clamping of the disc in the flange assembly, between the disc and the notch defining face of the lower ring which is perpendicular to the axis of the ring. Manifestly, resinous material tends to accumulate in this groove and during the course of a polymerization reaction the entire relief opening is oftentimes blocked by a "growth" of resinous material extending over the entire face of the disc assembly from the groove.

It is, therefore, the primary object of this invention to provide rupture disc pressure relief structure for polymerization reactors which does not tend to accumulate polymer as is the case with past assemblies and which can be readily and effectively cleaned.

Another very important object of the invention is to provide a rupture disc pressure relief structure wherein the structure presents an inner surface to which resinous materials will have a reduced tendency to adhere but which does not adversely affect the burst pressure of the assembly.

Another important object of the invention is to provide rupture disc pressure relief structure wherein the vacuum support and the frangible diaphragm are incorporated in a single component thereby eliminating the problem of buildup of resinous materials along the inner surface of conventional vacuum supports.

Another object of the invention is to provide a nonfragmenting rupture disc pressure relief structure wherein there are no grooves presented by the assembly wherein the buildup of resinous materials could occur.

Other objects of the invention will be made clear or become apparent from the following specification and accompanying drawing, wherein.

Figure 2:
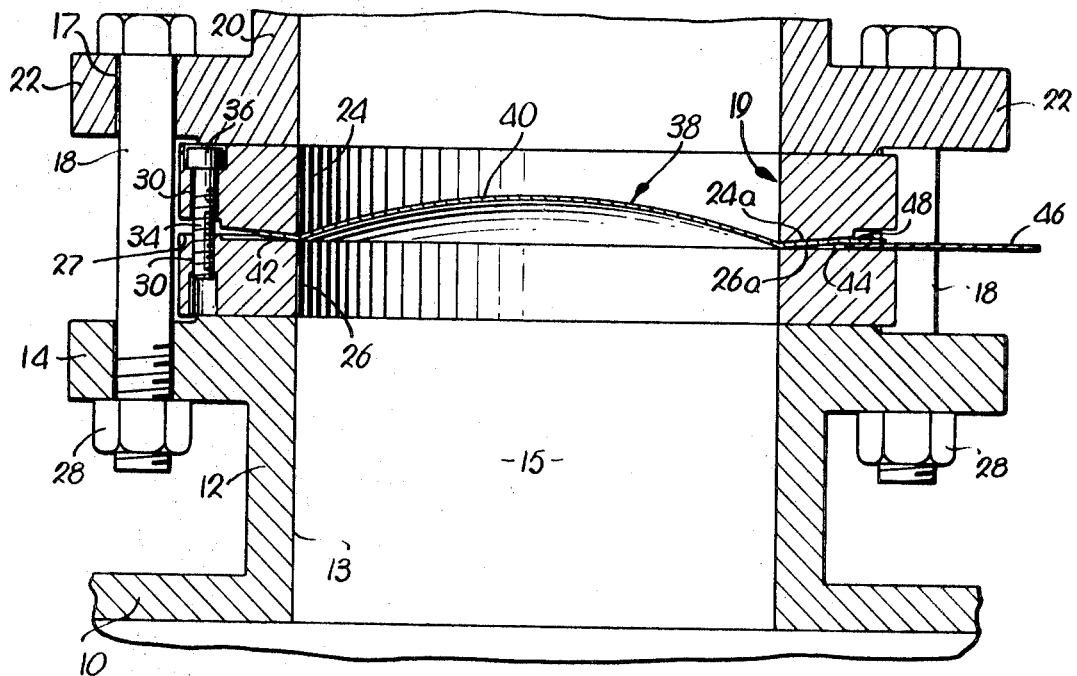
FIG. 2 is a cross-sectional view of the rupture disc assembly taken along line 2—2 to FIG. 1.

Referring to the drawing, top wall 10 of a structure such as a polymerization reactor (not shown) is provided with a pressure relief member 12 which terminates in an annular flange 14. Internal wall 13 of the annular member 12 defines an opening 15 in the polymerization reactor. The flange 14 is provided with a plurality of circumferentially spaced, threaded apertures 16 align with corresponding aperture 17 in flange 22 of relief conduit 20. Bolts 18 through aligned apertures 16 and 17 interconnect flanges 14 and 22 and are held in place by nuts 28.

The rupture disc is held by a flange assembly 19 which is clamped between flanges 14 and 22 and is made up of a primary flange ring member 24 and a base flange ring member 26 interconnected by a series of screws 34. The rings 24 and 26 are provided with a plurality of axially aligned, threaded apertures 30 and 32, respectively, for receiving a like number of threaded screws 34 having socket defining heads 36. The upwardly facing annular surface 26a of ring member 26 is essentially flat and in a plane perpendicular to the axis of the ring while the opposed annular face 24a of ring member 24 is of conical shape with the apex facing downwardly as shown in FIG. 2 so that the inner edge of the ring member 24 is in closest proximity to the opposed surface 26a of member 26.

A rupture disc generally designed 38 closes the opening 15 and includes a frangible diaphragm portion 40 of concavoconvex configuration and an outwardly extending peripheral flange section 42 contiguous with the portion 40. An outwardly projecting tab 46 joined to extension 44 from the periphery of flange section 42 by rivets 48 is adapted to be received in the groove 29 therefore in the upwardly facing surface 27 of ring member 26. The provision of groove 29 and lateral extension 44 assures that the assembly 38 will always be placed in exactly the same position relative to rings 24 and 26. This is desirable since tightening of screws 34 may result in flattening of the flange 42 to a different degree at different circumferentially spaced points resulting in a surface which is not truly planar. Thus, if the assembly 38 were removed from its position between the rings 24 and 26 and returned to a different position, there would be a possibility of a pressure leak.

Figure 3:
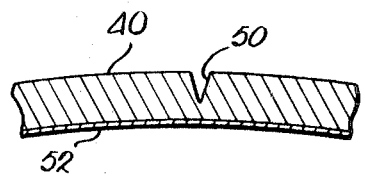
FIG. 3 is an enlarged, fragmentary, cross-sectional view taken along line 3—3 of FIG. 1.
Figure 1:
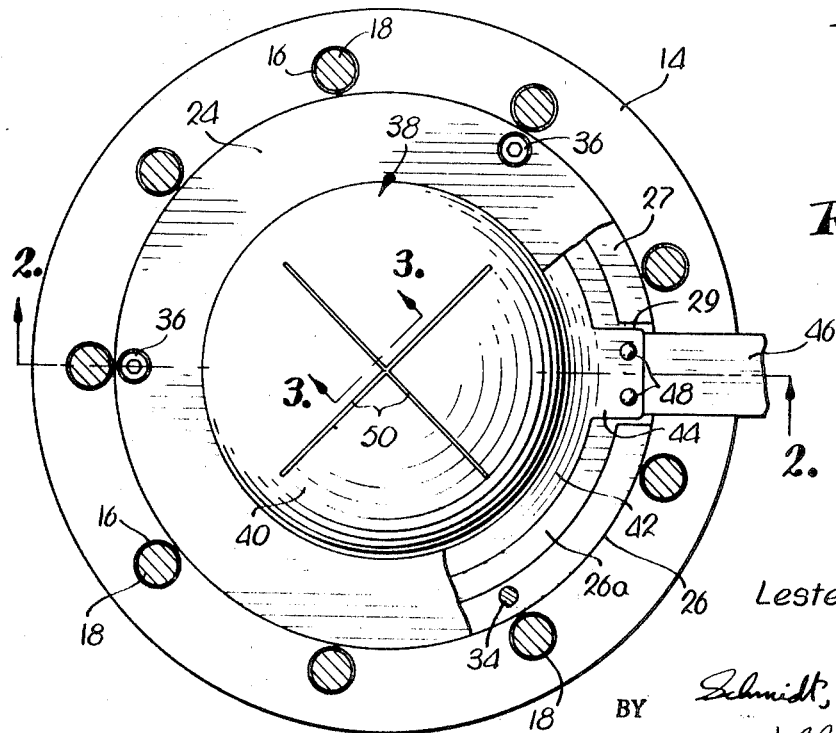
FIG. 1 is a plan view of a ruptured disc assembly constructed according to the preferred embodiment of the invention with portions of the associated mounting means being broken away for purposes of illustration.

Referring to FIG. 3, it is to be noted that the frangible diaphragm 40 is provided with a pair of V-shaped grooves 50 which have a depth of more than half the thickness of the frangible portion 40 and which intersect at the center of the latter. It has been found that by providing the grooves 50 in the frangible portion 40, the material chosen to fabricate the disc can be of a thickness at least three times as great as will be required to rupture it at a preselected positive pressure in the absence of the grooves 50. The added thickness of portion 40 provides the necessary strength for the portion 40 to resist negative pressures that might occur within the system, and yet the provision of the grooves 50 insures that the portion 40 will rupture at a preselected positive pressure. In addition, the above-normal thickness permits screws 32 and bolts 18 to be drawn down sufficiently tight to prevent a pressure leak without regard to possible deformation of the peripheral margin of the disc. With prior discs, it was not practical to clamp down tight along a marginal portion of the disc exposed to the pressure conditions because decrease of the normal thickness of the disc along any marginal part of the disc resulted in that deformed part having a lower burst pressure than the disc itself rendering the latter useless. But in the case of disc 38, grooves 50 determine the burst pressure of the disc and any deformation of the margin of the portion 40 by members 24 and 26 is inconsequential. In fact, this construction makes possible the use of a clamping assembly where the inner edge of surface 24a is forced toward face 26a to firmly grip the peripheral portion 42 of the disc and provide a fluid seal without leaving an annular groove which could collect polymer. The precise depth of each groove 50 is empirically determined for each assembly 38 but is always more than one-half the thickness of the disc material.

A layer of chromium 52 may be provided on the inner surface of the frangible portion 40, using conventional electroplating techniques, in a preferred thickness of from 0.0005 inches to 0.0020 inches, depending upon the size of the opening 15 and the type of resinous material in the associated reactor. It is desirable to electroplate an undercoat of copper, ranging in thickness from 0.0001 to 0.0002 inches before the chromium is plated on the portion 40. The layer of chromium 52 presents a smooth, nonporous surface to which the resinous material will not have a great tendency to adhere. Tests have shown that under certain operating conditions there is no adherence at all of resinous material to the chromium surface. Equally important any resinous material that does build up on the chromium surface 52 may be readily and effectively cleaned therefrom using either mechanical steam or solvent cleaning techniques.

Having thus described the invention, what is claimed as new and desired to be secured by Letters Patent is:

1. A rupture disc assembly adapted for mounting in the relief opening of a synthetic resin polymerization system susceptible to both positive and negative-pressure said assembly comprising:
   a metallic frangible member having an inner surface and an outer surface and provided with a central concavo-convex section with the inner face portion of the section adapted to be exposed to the atmosphere of the system being concave and the opposed outer face portion of the section being convex,
   said outer face portion of the section being provided with groove means therein,
   said member being of a thickness at least three times as great as would be required to rupture said section at a preselected positive pressure in the absence of said groove means in the section, and
   said groove means being of a depth at least half as great as the thickness of said member;
   a smooth layer of chromium covering said inner surface of the member; and
   a flange assembly having opposed disc clamping units each provided with an inner surface segment disposed to engage the peripheral portion of the disc in surrounding relationship to said section thereof, said units clamping the disc therebetween and the innermost edge of the surface segment of the unit in proximal supporting relationship to the inner surface of the disc being in tight engagement with said inner face of the peripheral portion of the disc to prevent accumulation of resin between the disc and the clamping unit exposed to said system.

2. The invention of claim 1 wherein said layer of chromium has a thickness of from 0.0005 to 0.0020 inch.

3. The invention of claim 1 wherein said groove means is defined by two elongated grooves at right angles with respect to each other.

4. The invention of claim 1 wherein said disc engaging surface segment of the unit in proximal supporting relationship to the inner surface of the disc is essentially flat and lies in a plane perpendicular to the axis of said section of the disc.

5. The invention of claim 4 wherein the disc engaging surface segment of the unit in proximal supporting relationship to the outer surface of the disc is of conical configuration with the innermost edge thereof being in contacting engagement with said peripheral portion of the disc.